United States Patent
Gerio et al.

(10) Patent No.: US 10,005,184 B2
(45) Date of Patent: Jun. 26, 2018

(54) INDUSTRIAL ROBOT AND A METHOD FOR CONTROLLING AN INDUSTRIAL ROBOT

(71) Applicant: Comau S.p.A., Grugliasco (Turin) (IT)

(72) Inventors: Gian Paolo Gerio, Grugliasco (IT); Allan Mathias Wiklund, Grugliasco (IT); Arturo Baroncelli, Grugliasco (IT)

(73) Assignee: Comau S.p.A., Grugliasco (Turin) (IT)

( * ) Notice: Subject to any disclaimer, the term of this patent is extended or adjusted under 35 U.S.C. 154(b) by 192 days.

(21) Appl. No.: 14/928,491

(22) Filed: Oct. 30, 2015

(65) Prior Publication Data

US 2016/0129595 A1     May 12, 2016

(30) Foreign Application Priority Data

Nov. 7, 2014 (IT) .............................. TO2014A0924

(51) Int. Cl.
  *B25J 9/16*         (2006.01)
  *B25J 13/08*       (2006.01)
  (Continued)

(52) U.S. Cl.
  CPC ........... *B25J 9/1676* (2013.01); *B25J 13/086* (2013.01); *B25J 13/088* (2013.01); *B25J 19/023* (2013.01);
  (Continued)

(58) Field of Classification Search
  CPC .. F16P 3/142; F16P 3/144; F16P 3/147; F16P 3/148; F16P 3/141; F16P 3/14; B25J 9/1676; B25J 9/1674; B25J 9/1697; B25J 13/086; B25J 13/088; B25J 19/023; B25J 19/063; B25J 19/06; Y10S 901/14; Y10S 901/30; Y10S 901/46; G05B 2219/40559; G05B 2219/43202; G05B 19/406; G05B 2219/36457; G05B 2219/36473;
  (Continued)

(56) References Cited

U.S. PATENT DOCUMENTS 6,212,443 B1   4/2001   Nagata et al.
8,412,379 B2   4/2013   Gerio et al.
(Continued)

FOREIGN PATENT DOCUMENTS

EP        1724072 A1    11/2006
EP        1810795 A1     7/2007
JP      2008220553 A     9/2008

OTHER PUBLICATIONS

Mohamed Karim Ettouhami, Human-Robot Collision Avoidance with RFID Sensors Using Fuzzy Logic and Extended Kalman Filter, Applied Mathematical Sciences, vol. 7, 2013, No. 52, 2555-2567.*
Italian Search Report for corresponding Italian Patent Application IT TO2014 A 000924, dated Aug. 28, 2015.

*Primary Examiner* — Abby Y Lin
(74) *Attorney, Agent, or Firm* — Young Basile Hanlon & MacFarlane, P.C.

(57) ABSTRACT

An industrial robot and control system including a high degree of cooperation between a human operator and the robot for increased safety. In an automatic operation mode, at least a first detection device detects the presence of a foreign body in the robot working area and the control system places the robot in a safe automatic operating mode. A second and third detection devices may be employed to detect possible impacts with the robot.

13 Claims, 6 Drawing Sheets

(51) Int. Cl.
*B25J 19/02* (2006.01)
*B25J 19/06* (2006.01)

(52) U.S. Cl.
CPC ............ *B25J 19/063* (2013.01); *Y10S 901/14* (2013.01); *Y10S 901/30* (2013.01); *Y10S 901/46* (2013.01)

(58) Field of Classification Search
CPC ........... G05B 2219/39091; G05B 2219/40202; A61B 6/4458
See application file for complete search history.

(56) References Cited

U.S. PATENT DOCUMENTS

| | | |
|---|---|---|
| 2008/0021597 A1 | 1/2008 | Merte et al. |
| 2008/0161970 A1 | 7/2008 | Adachi et al. |
| 2009/0171505 A1 | 7/2009 | Okazaki |
| 2009/0268029 A1 | 10/2009 | Haussmann et al. |
| 2012/0245733 A1* | 9/2012 | Bjorn ................ B25J 9/1676 700/253 |
| 2012/0297872 A1 | 11/2012 | Kaiser |
| 2013/0038707 A1* | 2/2013 | Cunningham ......... H04N 7/183 348/65 |
| 2013/0073084 A1* | 3/2013 | Ooga ................ B25J 9/1633 700/254 |
| 2013/0338829 A1 | 12/2013 | Schlaich et al. |
| 2014/0067121 A1 | 3/2014 | Brooks et al. |

\* cited by examiner

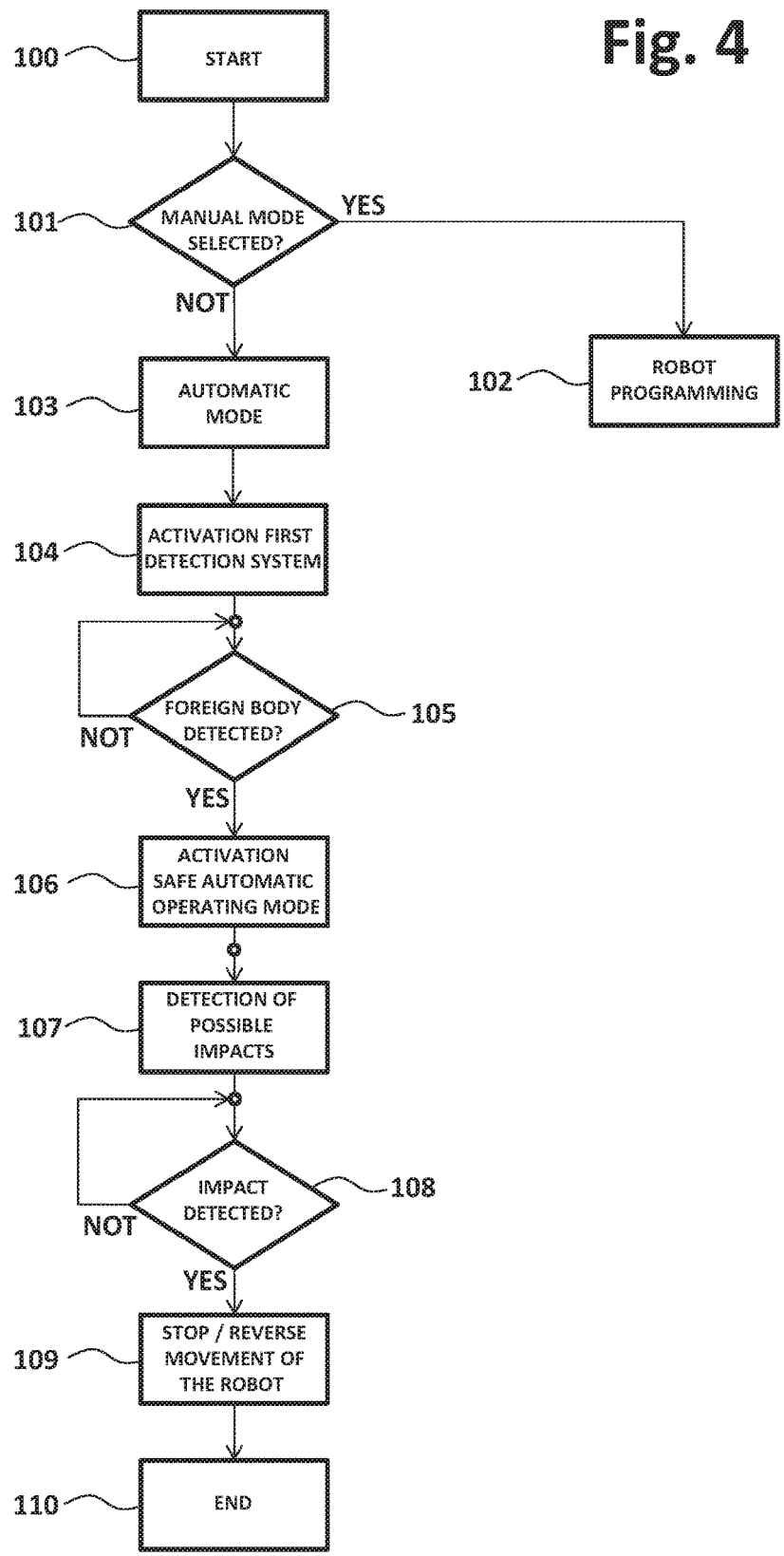

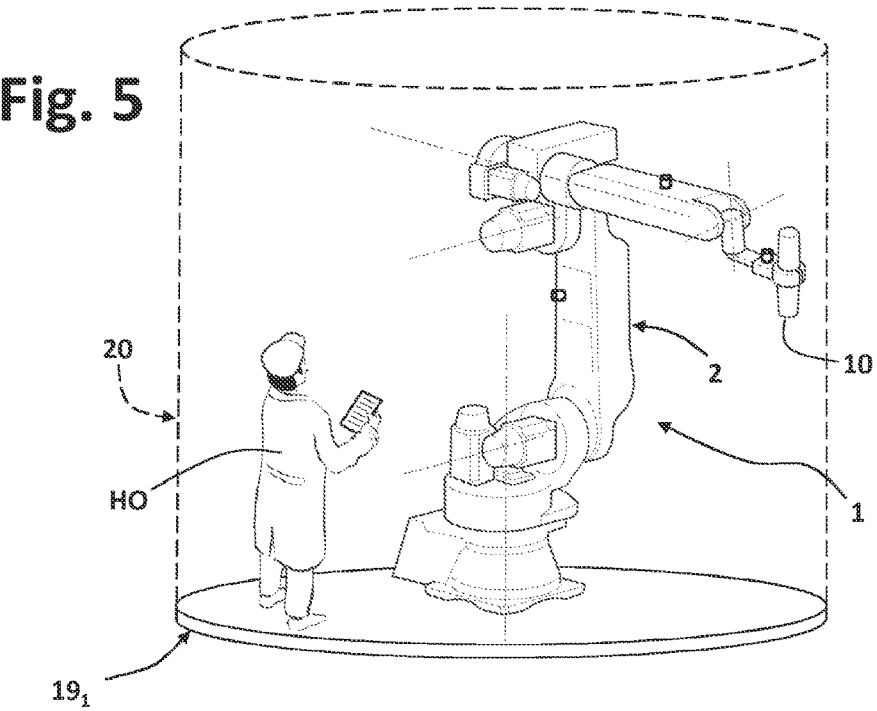
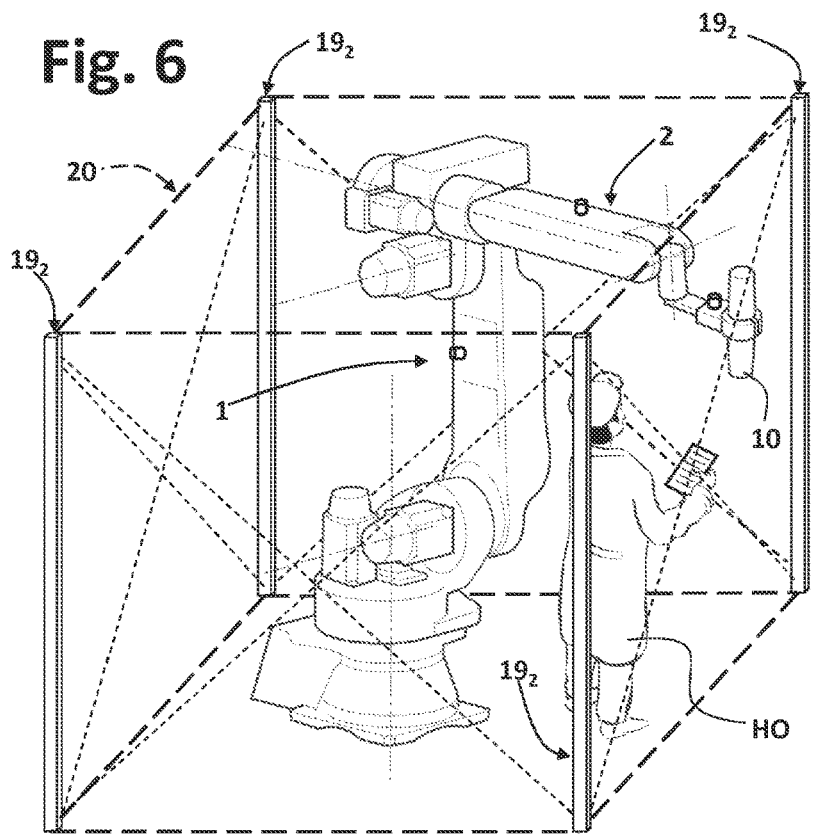

INDUSTRIAL ROBOT AND A METHOD FOR CONTROLLING AN INDUSTRIAL ROBOT

FIELD OF THE INVENTION

The present invention relates to industrial robots that comprise a manipulator and a control unit of the manipulator. The invention has been developed with particular reference to the question of co-operation between a human operator and such an industrial robot.

BACKGROUND

An industrial robot can normally operate in a manual mode and at least one automatic mode, which can usually be selected on the control unit of the manipulator. The manual operating mode is selected for the purposes of programming of the robot and, in this mode, the manipulator can be manoeuvred via commands imparted manually by an operator; in the automatic operating mode, instead, the movement of the manipulator is governed exclusively by its control unit.

The activity of programming of a robot with a number of degrees of freedom basically consists in teaching the robot the path that a point of its manipulator will have to repeat automatically in the course of the normal working steps, for carrying out a certain operation. This point is usually constituted by the so-called "Tool Center Point" (TCP), which identifies the position of the active part of an end effector of the manipulator, here understood as a machining tool or else as an ensemble consisting of a gripping device and the corresponding piece moved. The majority of the programming time is dedicated to governing the robot manually in order to identify the optimal points of the paths of movement of the TCP and store the corresponding coordinates thereof. For this purpose, a portable programming terminal, also known as "teach pendant" can be used, or else a manual guide device, directly mounted on the movable structure of the manipulator. It is also known to program an industrial robot in an off-line mode (Off-Line programming—OLP), using for the purpose a suitable program of a CAD type that simulates the working cell of the manipulator and that enables setting of the movements necessary for machining. Unlike the previous cases, this type of programming is performed substantially in a remote way, i.e., not in the immediate vicinity of the manipulator.

In order to govern manually the variations of the posture of the manipulator, the operator uses specific pushbuttons of the teach pendant, known as jog buttons or jog keys, which govern movement of one or more axes of the robot. By acting on the jog buttons of the teach pendant the TCP can be moved in a specific direction, whether positive or negative, within a reference system selected by the operator from among a plurality of possible reference systems. For instance, in an anthropomorphic robot with six degrees of freedom at least the reference systems "Joints", "Base" and "Tool" are typically provided, where the system Joints refers to the joints of the robot (a vector in this system represents the angular positions of each of the joints) and the systems Base and Tool are cartesian reference systems, the former referring to the base of the robot and the latter to the end effector provided on the end flange of the robot.

As compared to teach pendants, manual guide devices enable the activity of programming of the robot to be rendered more intuitive since they basically consist of a sort of grip associated to the movable structure of the manipulator on which the programmer acts to get the manipulator itself to perform the desired movements in the programming stage. In general, associated to the aforesaid grip is a force sensor that enables the control unit to recognize the direction of displacement desired by the programmer (see, for example, U.S. Pat. No. 6,212,443 A). As an alternative or in addition to a force sensor a joystick device may be provided (see, for example, U.S. Pat. No. 8,412,379 B).

In the majority of known solutions, the control unit of a robot is able to operate according to three different modes or states, namely a Programming mode, an Automatic mode, and a Remote mode.

In the Programming mode, an operator acts in the vicinity of the manipulator, as explained previously, in order to govern operation thereof, store the programming steps, and program the operating activity, by means of the teach pendant or the manual guide device.

The step of programming of the robot is clearly the one that involves greater risks for an operator, who must follow closely the TCP in order to check visually positioning thereof, moving continuously around the manipulator. For this reason, in the Programming mode restrictions of speed to the movements of the manipulator are normally activated. In the case of use of a teach pendant, the operator has then available in his own hands an emergency-stop pushbutton and an enabling device, which are both present on the terminal. In practice, if in the programming stage the enabling device is not kept active manually by the operator, the manipulator cannot perform any movement. In the case of a manual guide device, the grip itself constitutes a sort of enabling device given that its release by the operator cause the movement of the robot to stop. However, it is preferable to provide an emergency-stop device and an enabling device also in manual guide devices.

In the Automatic mode, the robot executes an operating program of its own, obtained as explained above, possibly in combination with other robot or automatic apparatuses, normally within a cell protected from access of staff, but under visual control of an operator.

Also in the Remote mode, the robot executes an operating program of its own within a cell normally protected from access of staff, but in this case start of execution of the program comes from a cell supervisor, such as a PLC, which, for example, controls both the robot and other automatic apparatuses present in the cell itself.

Also in the case of machining operations executed via industrial robots in Automatic or Remote mode, it may prove useful or necessary for an operator to approach the working area of the manipulator or move within its range, for example for controlling visually the precision or effectiveness of certain operations carried out by the manipulator.

For these cases, it is known to provide suitable systems designed to detect the presence of an operator within the working area of the manipulator or in its vicinity. These systems may, for example, be based upon the use of devices for acquisition and comparison of images, or else may use laser scanners or light barriers designed to detect entry of the operator into the working area of the manipulator. In general, following upon the detection made, the surveillance system stops operation of the robot. The area surveyed may also be divided into areas of different degrees of criticality: in this case, the operator who moves into an area relatively close to the manipulator but still outside of its range of movement receives a visual or acoustic warning; if, instead, the operator enters a second area, corresponding to the aforesaid range of movement, movement of the manipulator is stopped.

An approach of this sort guarantees a high degree of safety for the operators but frequently causes interruptions of the production flow that would not strictly be necessary.

SUMMARY OF THE INVENTION

In view of what has been set forth above, the object of the present invention is to provide an industrial robot and a control system for an industrial robot that will render possible a high degree of co-operation between a human operator and an industrial robot operating automatically, but without jeopardizing the necessary requisites of safety.

The above and other objects still, which will emerge clearly hereinafter, are achieved according to the present invention by an industrial robot and by a method for controlling an industrial robot that present the characteristics specified in the ensuing claims. The claims form an integral part of the technical teaching provided herein in relation to the invention.

BRIEF DESCRIPTION OF THE DRAWINGS

Further objects, characteristics, and advantages of the present invention will emerge clearly from the ensuing description and from the annexed drawings, which are provided purely by way of explanatory and non-limiting example and in which:

FIG. 4 is a simplified block diagram aimed at expressing a possible logic for controlling an industrial robot according to an embodiment of the invention;

FIGS. 5, 6, and 7 are partial and schematic perspective views of an industrial robot according to further embodiments of the invention.

DESCRIPTION OF EMBODIMENTS OF THE INVENTION

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" and the like that may be present in various parts of the present description do not necessarily all refer to one and the same embodiment. Furthermore, the particular configurations, structures, or characteristics may be combined in any adequate way in one or more embodiments. The references used in what follows are provided merely for convenience and do not define the sphere of protection or the scope of the embodiments.

It is moreover pointed out that in the sequel of the present description only the elements useful for an understanding of the invention will be described, taking for granted, for example, that the industrial robot according to the invention comprises all the elements in themselves known for its operation.

Figure 1:
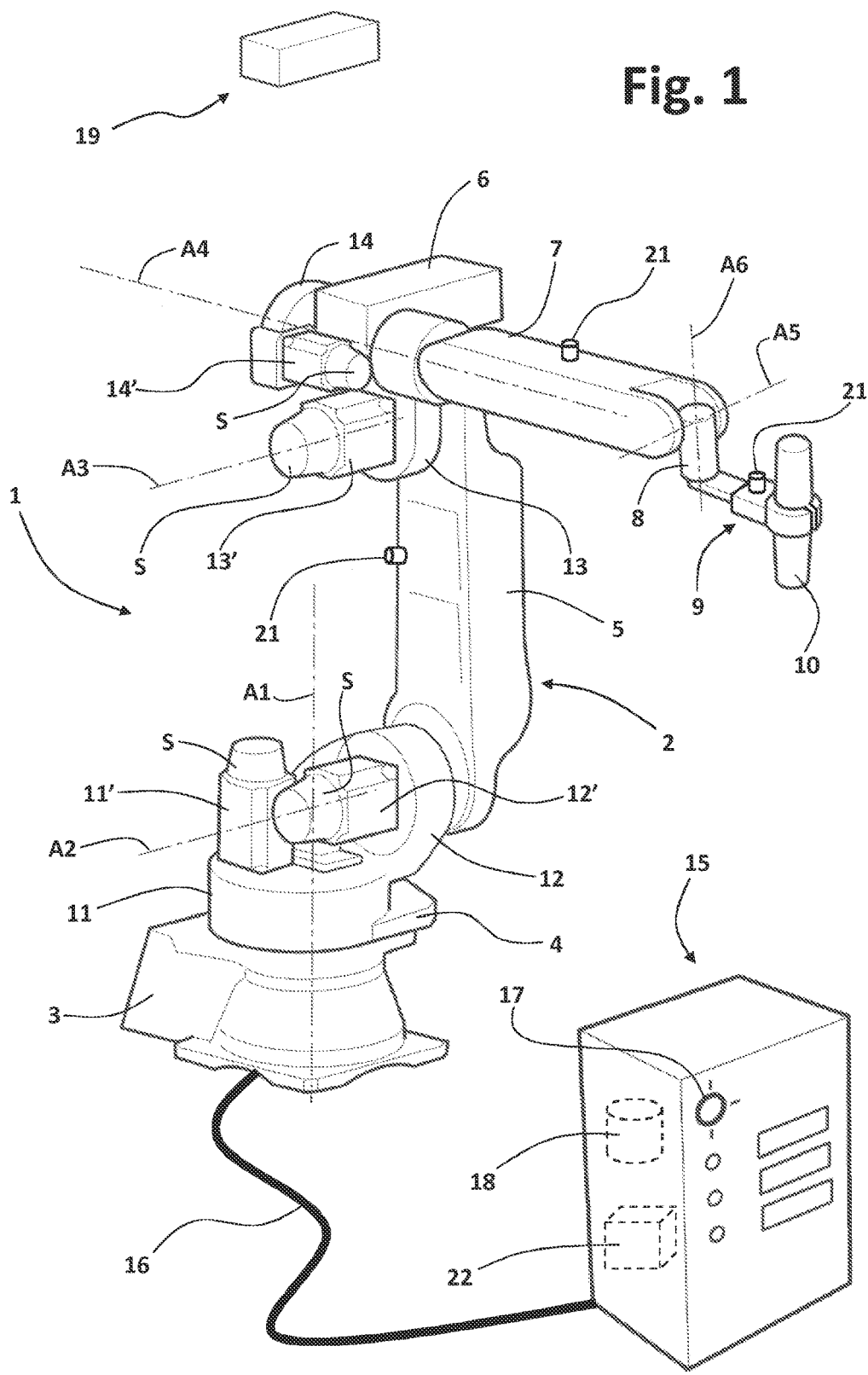
FIG. 1 is a partial and schematic perspective view of an industrial robot according to one embodiment of the invention.

Represented schematically in FIG. 1 is an industrial robot according to one embodiment of the invention, comprising a manipulator 1 with a number of degrees of freedom, having a mechanical structure 2 that comprises a plurality of movable parts. In the example illustrated, the robot is an anthropomorphic robot with six degrees of freedom having a stationary base 3 and a column 4 rotatably mounted on the base 3 about a first axis A1 oriented vertically. Designated by 5 is an arm mounted oscillating on the column 4 about a second axis A2 oriented horizontally. Designated by 6 is an elbow, mounted on the arm 5 so as to turn about a third axis A3, which is also oriented horizontally, the elbow 6 supporting a forearm 7, designed to turn about its axis A4, which consequently constitutes a fourth axis of movement of the manipulator 1. The forearm 7 is equipped at its end with a wrist 8, mounted for movement according to two axes A5 and A6. Associated to the flange of the wrist 8 is an end effector, designated by 9, which in the example is represented by a device for gripping a generic component 10. As explained in the introductory part of the present description, the end effector 9 and/or the piece 10 carried thereby identifies the so-called Tool Center Point (TCP).

The end effector 9 may be of any other type and be able to perform any other function known in the sector, for example a welding torch or welding jaw, a paint-spray gun, or a gun for application of a sealant, a drilling or grinding spindle, etc.

The movable parts 4-8 are connected together by means of joints 11, 12, 13 and 14, associated to which are respective electric motors 11', 12', 13', and 14', with corresponding gear-reducer transmission. The joints and the motors for the wrist 8 are not illustrated in the figures for reasons of greater clarity. In one embodiment, such as the one exemplified, also the end effector 9 has respective actuator means, which are not represented either for reasons of clarity. Associated to the aforesaid joints, i.e., to the corresponding motors, are corresponding transducers, for example of an encoder or resolver type, for control of position. Some of these transducers are designated by S in FIG. 1.

The movements of the manipulator 1 and the operations that can be carried out by the end effector 9 are managed by a control unit 15, which is located in a remote position with respect to the structure 2 and is connected to the electrical/electronic parts of the latter via a cable 16. The practical embodiment of the hardware and of the software regarding the unit 15, which is provided with a respective microprocessor control system, are independent of the purposes of the present description, apart from some aspects referred to hereinafter that pertain to the invention.

The control unit 15 is configured for controlling the manipulator 1 in a plurality of different operating modes, amongst which at least one automatic operating mode and preferably also a manual operating mode. For this purpose, the unit 15 comprises selection means 17, which can be operated by a user for selection of a desired operating mode from among the ones possible. In a preferred embodiment, the robot is able to operate in three selectable modes, i.e., a Programming mode, an Automatic mode, and a Remote mode, as indicated in the introductory part of the present description. In FIG. 1, the reference 17 hence designates a device for manual selection of the desired operating mode from among the ones indicated.

Implemented in the control unit 15 is the program or software that supervises operation of the manipulator 1, in the three modes indicated. This program—represented schematically by block 18—preferably includes at least one dynamic model for control of the manipulator 1. The software 18, or the corresponding dynamic model, can be defined according to any technique in itself known in the sector for controlling industrial robots, and consequently will not be described in detail herein. Here it will suffice to point out that this program or model includes the relations that express at least the theoretical values of position, speed, and acceleration of the parts of the movable structure of the manipulator 1 (including its motors) for the purposes of control of its movement, as well as the relations that express theoretical values of torque applied by the electric motors of the various connection joints provided. For the purposes of the control of position also the transducers S are obviously used.

As explained previously, in the Programming mode, an operator "simulates" a machining step, which the manipulator 1 will then be called upon to perform in the Automatic or Remote mode, by varying the posture of the manipulator itself via a teach pendant or else a manual guide device (or possibly in OLP mode). In the Automatic or Remote mode, the movements of the manipulator are instead governed directly by the control unit 15.

As regards what is of specific interest herein, when the robot has to operate automatically (Automatic or Remote mode), the electric motors associated to the joints and to the wrist of the structure 2 are driven by the unit 15 according to working-speed profiles determined by the control program 18, i.e., by the corresponding dynamic model.

The industrial robot according to the invention includes a first detection system, prearranged for detecting the possible presence of an operator—or more in general of a foreign body—in a predefined working area of the manipulator 1. This detection system may for example comprise one or more devices selected from among image-sensor devices, light-beam sensing devices (visible and non-visible light), radiofrequency devices, force-transducer devices.

In one embodiment, for example, the first detection system includes a surveillance system based upon the use of a plurality of image-recording units. Systems of this type are in themselves well-known in the field and do not require any in-depth description. Here let it suffice to recall that in these systems different recording units record images of a three-dimensional area undergoing surveillance, and a processing unit detects the presence of foreign bodies in the three-dimensional area, on the basis of comparisons made between the images recorded by the various units. For a description of an example of this type of detection systems, the reader is referred to US2009268029 A1, the teachings of which are considered as being incorporated herein for reference. For instance, in the embodiment illustrated in FIGS. 1 and 2, designated as a whole by 19 is a sensing device including a plurality of image-recording units, for example obtained according to the technique described in the aforesaid US2009268029 A1 (see, in particular, FIG. 4 of this prior document).

Figure 2:
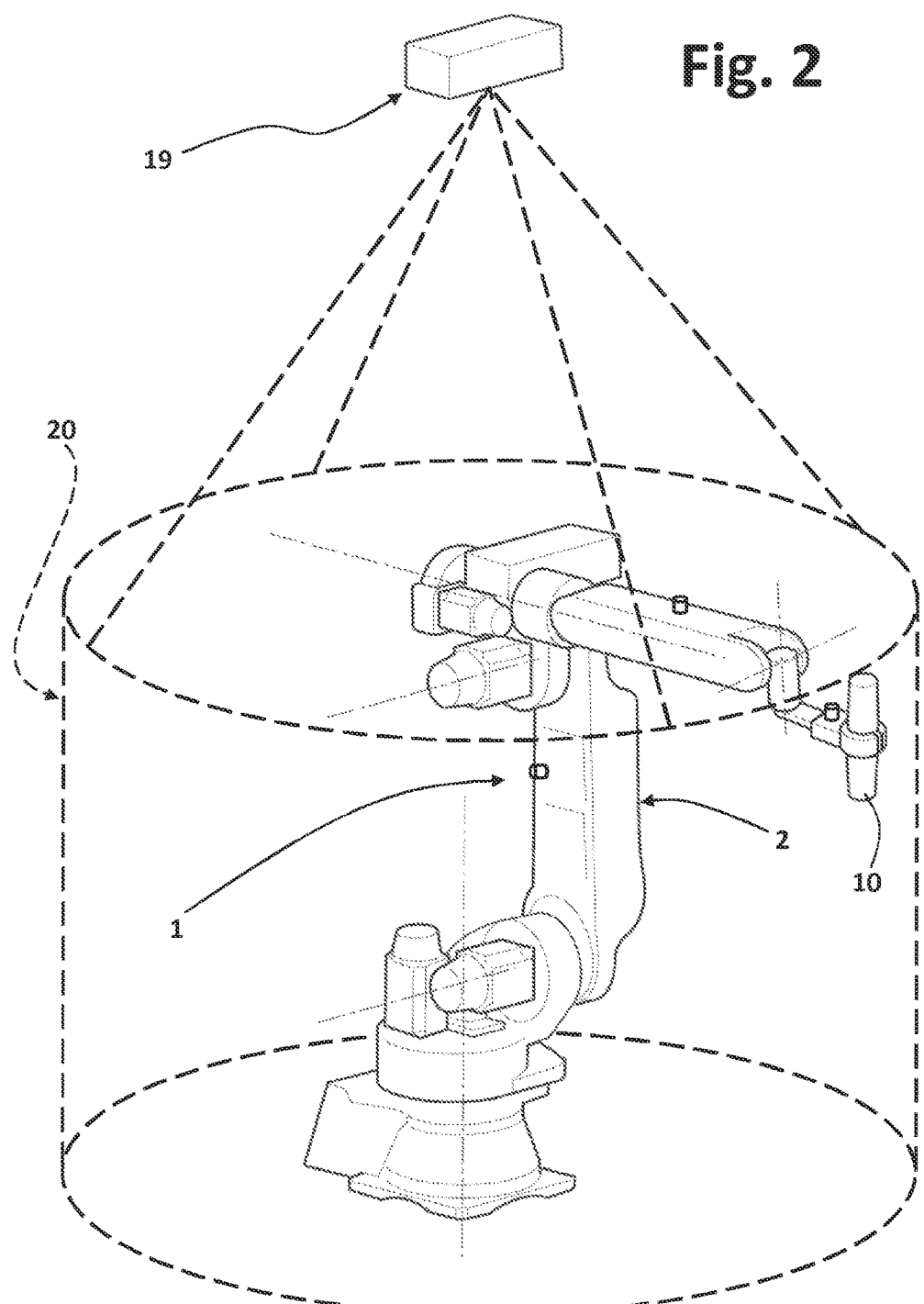
FIG. 2 is a partial and schematic perspective view of the industrial robot of FIG. 1 in a first working condition.

In FIG. 2, the three-dimensional area, designated by 20, undergoing surveillance by the device 19 is the area within the limits of which the movable structure 2 of the manipulator 1 is able of move, in particular with reference to its most extreme part—here represented by the end effector including the gripping device 9 and by the corresponding piece 10 being handled (it may be noted that in FIG. 2, as in FIGS. 3 and 5-7, the working area 20 of the manipulator 1 is represented with dimensions smaller than those theoretically possible in view of the articulations of the manipulator itself).

The robot according to the invention moreover includes a second detection system, comprising one or more inertial sensors installed on the manipulator 1. In the embodiment of FIG. 1, three inertial sensors 21 are, for example, provided, mounted respectively on the arm 5, on the forearm 7, and on the end effector 9. In a preferred embodiment, the sensors 21 are accelerometers of a commercial type, but not excluded from the scope of the invention is the case of use of gyroscopes.

The industrial robot according to the invention moreover includes a third detection system 22, which comprises means for measuring the torque applied by at least some of the electric motors of the manipulator 1, such as for example the motors 11'-14' and the motors associated to the wrist 8. Also the means for measuring the torque may be of any type known in the sector. In a particularly advantageous embodiment, measurement of the torque is carried out indirectly, and for this purpose means for measuring the current absorbed by the aforesaid motors are provided. According to a technique in itself known, the program 18 implemented in the control unit 15 includes the relations existing between the values of torque that can be applied by the aforesaid motors and the corresponding current absorptions. These measuring means, which preferably comprise one or more amperometric sensors in the control unit 15, are represented schematically in FIG. 1 by block 22.

According to the invention, the unit 15 is prearranged in such a way that—when the robot operates automatically (i.e., in the Automatic mode or in the Remote mode), detection by the first detection system 19 of the presence of a foreign body, i.e., an operator, within the working area 20 determines automatic selection of a Safe Automatic Operating mode.

Figure 3:
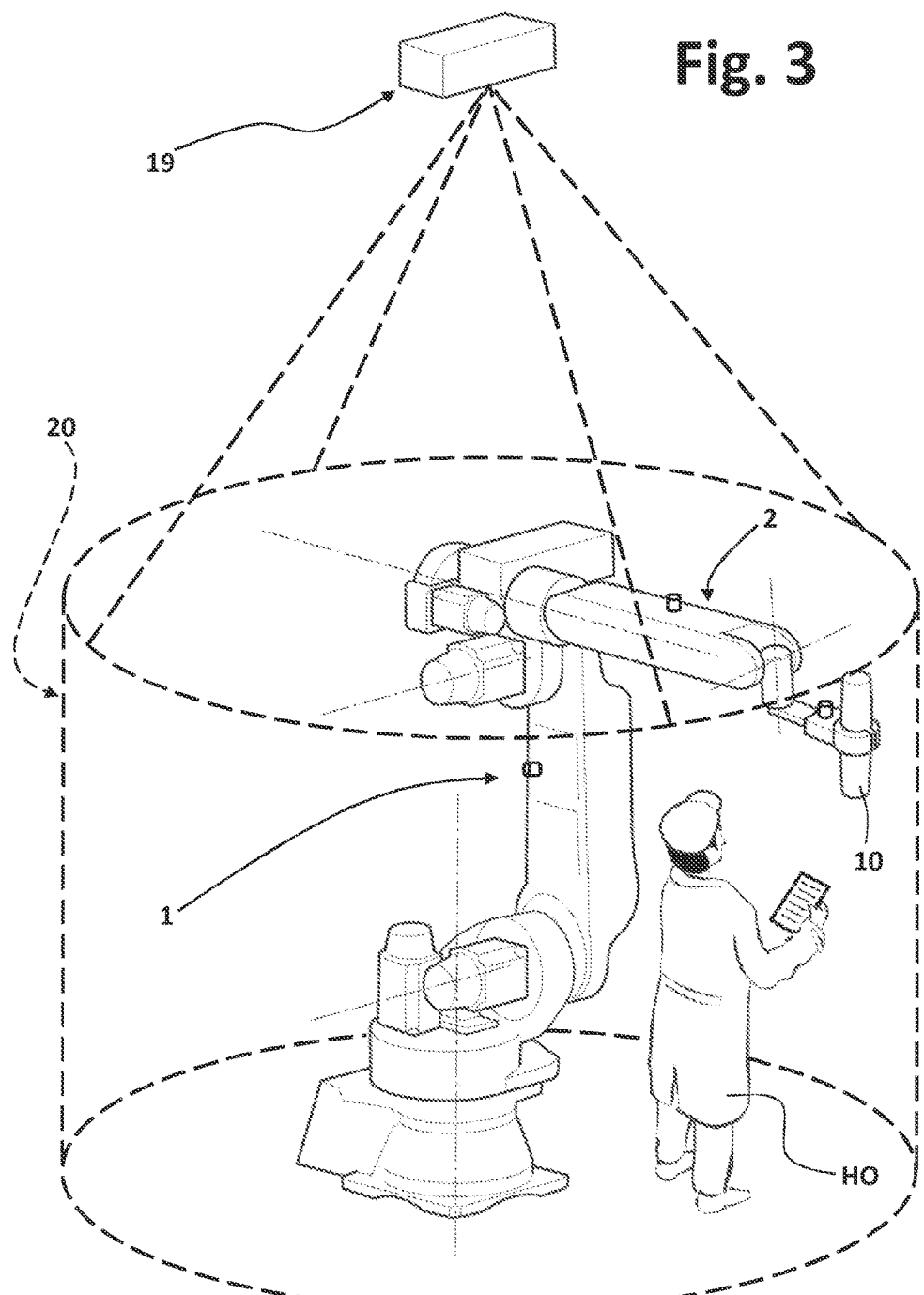
FIG. 3 is a partial and schematic perspective view of the industrial robot of FIG. 1 in a second working condition.

Such a case is exemplified in FIG. 3, where designated by HO is an operator who enters the area 20, for example to carry out a qualitative check on operation of the manipulator 1.

Following upon automatic switching into the aforesaid Safe Automatic Operating mode, the control unit 15 governs reduction of the driving speeds of the electric motors of the manipulator 1 with respect to the working speeds imposed by the control program for carrying out the machining operations in Automatic or Remote mode. In greater detail, the speeds of the motors are reduced to safety speeds determined by the program 18 for the Safe Automatic Operating mode. These safety speeds are not higher than a predetermined speed threshold, deemed sufficiently safe: preferably, this threshold is 250 mm/s.

In the case where the operator HO leaves the working area 20—circumstance detected via the surveillance system 19—the control unit 15 governs return of the robot to the condition of normal operation, i.e., to the Automatic mode or to the Remote mode originally selected manually.

In the Safe Automatic Operating mode, the control unit 15—in addition to reducing the speed of the motors—monitors the state of the aforesaid second and third detection systems 21 and 22 in order to detect a possible impact between movable parts of the structure 2 of the manipulator 1 and the operator HO (or other foreign body) present in the working area 20 undergoing surveillance by the first detection system 19.

According to a characteristic of the invention, both of the detection systems 21 and 22 are used for this purpose. Detection of any possible impact based upon the use of the accelerometers 21 is made by comparing cyclically the theoretical acceleration values determined by the control program 18 with the real acceleration values measured via the accelerometers 21. The specific algorithm of comparison may be of any type deemed suitable for the purpose. For instance, a possible criterion is to calculate the difference between the theoretical value of acceleration and the value of acceleration measured and to verify whether this difference is equal to or higher than a predefined threshold, for example equal to 10% of the theoretical value of acceleration.

The present Applicant has found that the use of accelerometers or other inertial sensors proves perfectly suitable for detecting impacts of an impulsive type, i.e., instantaneous or sudden impacts against the movable structure of the manipulator, which in a unit of time (for example 1 s) give rise to a high energy and as such generate in an inertial sensor a pulse that is clearly distinguishable (consider, for example, an operator who bumps against the structure of the robot with an arm or with a generic rigid object that he has in his hand).

Instead, the signals generated by this type of sensors do not enable precise discrimination (if not at the expense of a considerable burdening of the control logic and of the processing capacity of the unit 15) of impacts of a non-impulsive type, i.e., contacts with the structure of the robot that are prolonged and that in the unit of time have a low energy (consider, for example, the case of a part of the movable structure of the manipulator that exerts a progressive pressure on a part of the body of an operator).

For this reason, according to the invention, the control unit 15, in parallel to monitoring of possible collisions by the system of accelerometers 21, also carries out monitoring based upon analysis of the torque applied by the motors that drive the movable parts of the manipulator 1. Also in this case, basically the unit 15 cyclically compares the theoretical values of torque determined by the control program 18 with the values of torque measured via the detection system 22. In the example considered herein, as has been said, this type of monitoring is indirect and based upon the comparison between the theoretical absorptions and the real absorptions of the electric motors associated to the mobile parts of the manipulator 1. Also in this case, the specific algorithm of comparison may be of any type deemed suitable for the purpose. For instance, also in this case a possible criterion is to calculate the difference between the theoretical value of absorption and the measured value of absorption and verify whether this difference is equal to or higher than a predefined threshold, for example equal to 10% of the theoretical value of acceleration.

Monitoring of the real values of torque or current absorption, on the other hand, does not enable rapid and precise discrimination of impact of an impulsive type. For this reason, according to the approach proposed herein, the systems 21 and 22 must be understood as complementary to one another, for the purposes of a more convenient and prompt detection of any possible impact of movable parts of the manipulator 1 against the operator HO or another foreign body present in the working area 20.

Following upon detection of an impact—via the system 21 and/or the system 22—the control unit 15 governs stopping of the movement of the structure 2 of the manipulator 1 or else governs a reversal of its movement, in particular prior to its stopping, for example for a given travel (the manipulator may be driven in reverse until it assumes a predefined posture, for example with the parts of its structure in a position as vertical as possible). Stopping or reversal of movement is aimed at safeguarding the operator HO after an impact is detected.

As may be seen, according to the invention, there is allowed a high degree of co-operation between a robot, albeit operating automatically, and an operator who enters the working area of the corresponding manipulator, but in any case in conditions of high degree of safety.

It will be appreciated, for example, that, if the operator HO has to move for any reason into the area 20, operation of the manipulator 1 is not interrupted, but the latter assumes a safe operating condition, distinguished by extremely slow displacements of its structure, with low accelerations and low energy (operating at a low speed, in fact, the movable structure of the manipulator cannot generate high energy in a short lapse of time). This safety speed enables the operator HO to stop (stand) or move about with complete assurance within the area 20, i.e., without any need to carry out fast displacements or be concerned about possible sudden movements of the manipulator 1. The reduced speed enables effective co-operation between the operator and the robot also for the purposes of execution of a machining operation, for example with the operator who passes a workpiece to the manipulator, or else who picks up a machined piece from the manipulator, or again with the manipulator that supports a piece on which the operator carries out a manual operation or an operation performed with the aid of a tool, for example a wrench.

Exit of the operator HO from the area 20 automatically determines restoration of the normal working condition of the robot, such as the Automatic mode or the Remote mode, at the highest speed envisaged by the program for normal operation.

Even in the case where a movable part of the manipulator 1 comes into contact with the body of the operator HO, the effects of the impact are modest on account of the low speed of displacement of the manipulator: safeguarding of the person is in any case high, on account of the immediate stopping of movement of the manipulator and/or of reversal of its movement following upon detection of impact.

FIG. 4 represents a simplified block diagram, aimed at exemplifying a possible control program for an industrial robot, limitedly to the part that pertains to the present invention.

Block 100 is the block representing start of the program, for example on occasion of a start command imparted via the unit 15. Control passes to the test block 101, via which a check is made to verify whether a manual mode is selected (Programming mode). If it is (output YES), control passes to block 102 for management of programming of the robot, according to modalities in themselves known that are irrespective of the present invention. If it is not (output NO), an automatic mode (Automatic or Remote mode) is selected, and control that then passes to block 103, for management of operation of the robot according to the working program defined by the specific application, also in this case according to modalities in themselves known that are irrespective of the present invention.

Control then passes to the next block 104, for activation of the first detection system 19, i.e., the system for surveillance of the working area of the manipulator 1. Via the next test block 105 a check is made to verify whether the system 19 detects or not the presence of an operator HO (or, more in general, of a foreign body) in the working area 20. If it does not (output NO), the check is repeated, whereas if it does (output YES), control passes to block 16, for activation of the Safe Automatic Operating mode, with consequent reduction of the speed of displacement of the structure of the manipulator. Control then passes to block 107, for monitoring any possible impact by the detection systems 21 and 22.

In the case of absence of detection of impact (output NO), monitoring is repeated, whereas, in the case of detection of an impact (output YES), control passes to block 109, which regards the command for stopping the movement of the manipulator 1, after prior possible reversal of its movement or displacement towards a predefined position of lie. Control then passes to block 110 for end of the program.

As already mentioned, the diagram of FIG. 4 is provided merely by way of example, in so far as it is aimed at summing up in an intuitive way the steps of the control method proposed. For instance, in actual fact, it is preferable for the control made by the detection system 19 to be carried out in a constant way (unlike what is represented by block 105 of FIG. 4) so that, when the operator HO moves back out of the working area 20 of the manipulator 1, the robot exits autonomously from the Safe Automatic Operating mode, to return to the Automatic or Remote mode.

As mentioned previously, the first detection system is not necessarily based upon the use of image-sensor devices, it being possible for any other presence-detection system to be used for the purpose.

FIG. 5, for example, represents schematically the case of a presence-detection system based upon the use of force sensors. In the case exemplified, the working area 20 of the manipulator 1 is subtended by a platform or base 191, associated to which are force sensors or load cells (not indicated) designed to detect the presence on the platform itself of foreign bodies that have a weight higher than a certain threshold, for example 1 kg. As may be appreciated, when the operator HO moves onto the platform 191, his presence is detected via the aforesaid force sensors, with the robot that moves automatically into the Safe Automatic Operating mode, and then returns to the Automatic or Remote mode when the operator leaves the platform.

FIG. 6 represents schematically the case of a presence-detection system based upon the use of light-beam devices or light-barrier devices, for example laser scanners 192 arranged so that the beams emitted circumscribe at least in part the working area 20 of the manipulator 1. In FIG. 6, the scanners circumscribe the entire area 20 laterally, but the latter could be circumscribed in part by means of metal structures and in part via a laser scanner. Of course, also other devices may be used for the purpose designed to generate light beams or light barriers that, when interrupted by the operator HO, determine passage of the robot into the Safe Automatic Operating mode. In applications of this type, it is preferable for the robot to be restored to the normal working condition (i.e., the Automatic or Remote mode) manually, for example by acting on a control means purposely provided on the control unit 15, in order not to complicate surveillance of the presence-detection system excessively.

Figure 7:
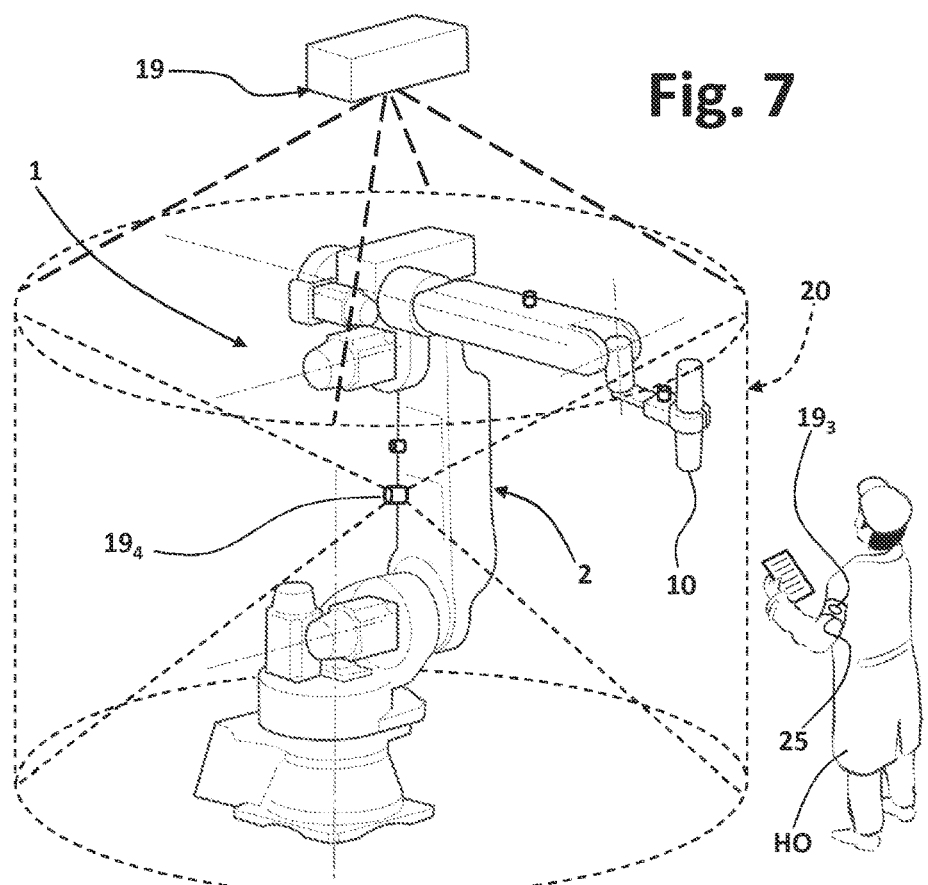

FIG. 7 represents schematically the case of a presence-detection system based upon the use of radiofrequency devices, in particular an RFID system. In this embodiment, the identification system comprises a portable transponder 193, in particular configured for being carried by an operator HO. In the example, the transponder 193 is associated to a band 25 that the operator HO carries on his arm. The transponder 193 may of course be associated to other objects or garments that have to be worn or carried by an operator, such as, for example, a jacket, a glove, a badge, goggles, etc. The detection system then comprises a transponder reader 194, installed within the working area 20.

In this case, the transmission/reception range of the RFID system 193-194 is chosen in such a way as to cover a three-dimensional area at least corresponding to the range in which the manipulator 1 is able to move.

An RFID system of the type indicated may be used to advantage in combination with a different surveillance system, for example a system based upon image sensors of the type designated previously by 19. In such an embodiment, the control logic of the robot may be prearranged so as to implement different safety levels, i.e., to guarantee co-operation of the robot according to the invention only with qualified operators.

With reference, for example, to FIG. 7, the RFID system may be prearranged so as to cover a three-dimensional area 20 at least equal to or larger than the one covered by the system 19, for example substantially corresponding to the working area 20 of the manipulator 1. In the case where an operator without the transponder 193 (i.e., a "non-authorized" operator) enters the area 20, his presence is in any case detected by the system 19, with the control unit 15 that consequently stops movement of the manipulator 1. Instead, if the operator HO who moves into the area surveyed by the system 19 takes along with him the transponder 193 (and is hence an "authorized" operator), he is recognised via the reader 194 so that the system does not bring about stopping the operation of the robot, but passage into the Safe Automatic Operating mode, as described previously.

Of course, a system based upon the use of radiofrequency devices of the type referred to can be used in combination also with surveillance systems that do not use image sensors, such as for example systems of the type described with reference to FIGS. 5 and 6.

In one embodiment, in order to increase further the safety of operators that are to operate in the proximity of the manipulator 1, there may be associated to one or more movable parts of the latter covering elements that preferably have a structure that is at least in part yielding.

Figure 8:
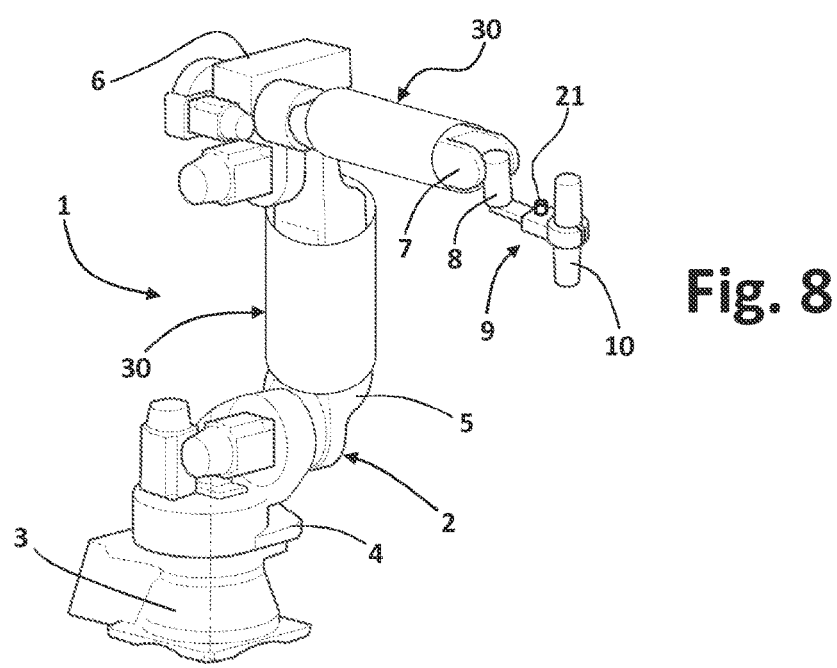
FIG. 8 is a partial and schematic perspective view of an industrial robot according to a variant embodiment of the invention.

An example of this sort is represented schematically in FIG. 8, where associated to the arm 5 and to the forearm 7 of the manipulator 1 are covering elements, designated by 30, with a substantially tubular shape, these basically having the function of attenuating any possible impact between the aforesaid parts and an operator. Of course, the specific conformation of the covering elements 30 provided may be different from the one exemplified, in particular so as to reproduce the profile of the structure of the manipulator 1, without significantly increasing the encumbrance thereof. In an embodiment of this sort, the inertial sensor or sensors of the second detection system that equips the robot according to the invention may be associated to the covering element or elements provided.

From the foregoing description, the characteristics of the present invention emerge clearly, as likewise do its advantages.

It is clear that numerous variations may be made by the person skilled in the art to the industrial robot and to the control method described by way of example herein, without thereby departing from the scope of the invention as defined by the ensuing claims.

In a particularly advantageous variant embodiment, the control unit of the robot according to the invention is prearranged for storing information representing acceleration values measured via the detection system based upon the inertial sensors 21. This measure may prove particularly useful for diagnostic purposes and for verifying the state of service and operation of the manipulator. For this purpose, for example, there may be envisaged a periodic comparison between theoretical acceleration values determined by the control software of the robot and values actually detected by the sensors 21, stored in the control unit 15 and possibly processed (for example, to obtain mean values). In this regard, it is to be considered that the sensors 21 are in any case kept active in the course of the machining operations carried out in Automatic or Remote mode. Comparison between the theoretical values and the real ones may be made via a purposely provided diagnostic program implemented on the control unit 15. The presence of significant deviations between the expected values and those actually measured may be considered as representing possible problems of the mechanical structure of the manipulator, for example due to onset of play or yielding.

Similar considerations may be applied in relation to the possibility of storing information representing values of torque or current absorptions that can be measured via the corresponding detection system 22, which also can be compared with homologous theoretical values in order to deduce possible faulty conditions of the manipulator, due for example to its wear, play, or yielding.

The invention may be applied on industrial robots of different sizes and loads, and hence both robots for modest loads (for example, a few kilograms) and robots for high loads (for example, hundreds of kilograms), as well as on robots of a type different from the anthropomorphic ones exemplified herein, for example robots with cartesian configuration, cylindrical configuration, polar configuration, and SCARA (Selective Compliance Assembly Robot Arm) configuration. Consequently, also the joints that connect the rigid parts of the movable structure of the manipulator may be of a different type according to the type of robot, such as rotoidal joints, prismatic joints, or helical joints.

What is claimed is:

1. An industrial robot comprising:
   a manipulator with a number of degrees of freedom, having a mechanical structure comprising a plurality of movable parts, amongst which an end effector and one or more connection joints driven by electric motors with associated corresponding position transducers;
   a control unit of the manipulator, comprising a selection device operable by a user for selection of a plurality of possible operating modes of the robot, amongst which at least one automatic operating mode;
   a first detection system, operable to detect a presence of a foreign body in a predefined working area of the manipulator;
   a second detection system comprising one or more inertial sensors installed on the manipulator;
   a third detection system comprising a torque measuring device operable to measure a torque applied by the electric motors;
   wherein implemented in the control unit is a program for control of the manipulator, the control program including relations that express theoretical values of position, speed, and acceleration of parts of the mechanical structure and relations that express theoretical values of torque applied by the electric motors;
   wherein the control unit is configured for driving the electric motors at working speeds determined by the control program at least in the automatic operating mode;
   wherein the control unit is configured in such a way that, with the robot in the automatic operating mode, detection by the first detection system of the presence of a foreign body within the predefined working area of the manipulator determines selection of a safe automatic operating mode of the robot;
   wherein, in the safe automatic operating mode, the control unit is operative for:
   reducing the speeds of the electric motors to safety speeds determined by the control program, not higher than a speed threshold that is lower than the working speeds;
   separately monitoring the second detection system to detect an impulsive impact of the mechanical structure against the foreign body by comparing theoretical acceleration values determined by the control program with acceleration values measured via the inertial sensors;
   separately monitoring the third detection system to detect a non-impulsive impact of the mechanical structure against the foreign body by comparing theoretical values of torque determined by the control program with values of torque measured via the torque measuring device; and
   in the case of detection of an impulsive or non-impulsive impact of the mechanical structure against the foreign body, stopping the movement of the mechanical structure or governing reversal of the movement of the mechanical structure.

2. The industrial robot according to claim 1, wherein the one or more inertial sensors of the second detection system comprise one or more of an accelerometer or a gyroscope.

3. The industrial robot according to claim 1, wherein the first detection system comprises one or more of an image-sensor device, a force-transducer device, a light-beam device, a light-barrier sensor device, or a radio frequency device.

4. The industrial robot according to claim 1 wherein the third detection system comprises a sensor operable to measure an electric current absorbed by the electric motors.

5. The industrial robot of claim 4 wherein the sensor comprises an amperometric sensor.

6. The industrial robot according to claim 1 further comprising covering elements connected to the mechanical structure, the covering elements having a yielding structure.

7. The industrial robot according to claim 3, wherein the first detection system comprises a radio frequency identification system.

8. The industrial robot according to claim 7, wherein the radio frequency identification system comprises a portable transponder, configured for being carried by an operator, and a transponder reader installed in the predefined working area.

9. The industrial robot according to claim 1, wherein the control unit is configured for:
   storing at least one of information representing acceleration values measured via the second detection system and information representing values of torque measured via the third detection system; and
   using said information for at least one of diagnostic purposes or purposes of verification of the operating state of the manipulator.

10. The industrial robot according to claim 1, wherein the speed threshold is not higher than 250 millimeters per second (mm/s).

11. The industrial robot according to claim 1, comprising at least two different first detection systems operable to detect the presence of the foreign body in the predefined working area of the manipulator, one of the two first detection systems including a radio frequency (RFID) arrangement.

12. A method for controlling an industrial robot that comprises:
   providing an industrial robot comprising a manipulator with a number of degrees of freedom having a mechanical structure comprising a plurality of movable parts, amongst which an end effector and one or more connection joints driven by electric motors with associated corresponding position transducers;

providing a control unit of the manipulator, the control unit comprising a selection device that can be operated by a user for selection of a plurality of possible operating modes of the robot, amongst which at least one is an automatic operating mode;

implementing in the control unit a program for control of the manipulator, the control program including relations that express theoretical values of position, speed, and acceleration of parts of the mechanical structure and relations that express theoretical values of torque applied by the electric motors;

driving the electric motors at working speeds determined by the control program at least in the automatic operating mode;

providing a first detection system operable to detect a presence of a foreign body within a predefined working area of the manipulator;

providing a second detection system comprising one or more inertial sensors installed on the manipulator;

providing a third detection system, comprising a torque measuring device operable to measure the torque applied by the electric motors, wherein, with the robot in the automatic operating mode, the control unit selects a safe automatic operating mode following upon detection, by the first detection system, of the presence of the foreign body within the predefined working area of the manipulator;

wherein, in the safe automatic operating mode, the control method comprising the steps of:

reducing the speeds of the electric motors to safety speeds determined by the control program, not higher than a speed threshold that is lower than the working speeds;

separately monitoring the second detection system through comparing theoretical acceleration values determined by the control program with effective acceleration values measured via the second detection system in order to detect an impulsive impact of the mechanical structure against the foreign body; and separately monitoring the third detection system through comparing theoretical values of torque determined by the control program with effective values of torque measured via the third detection system in order to detect non-impulsive impact of the mechanical structure against the foreign body; and wherein, in the case of detection of the detected impulsive or non-impulsive impact between the mechanical structure and the foreign body, the control unit operable to at least one of stop the movement of the mechanical structure, or govern reversal of the movement of the mechanical structure.

13. An industrial robot control system comprising:

a manipulator having a plurality of electric motors;

a control unit in electronic communication with the manipulator, the control unit having an automatic operating mode and a safe automatic operating mode, the control unit further having theoretical acceleration values and theoretical torque values stored in a memory device;

a first detection device in data communication with the control unit, the first detection device operable to detect the presence of a foreign object in a predetermined work area of the manipulator;

a second detection device comprising at least one inertial sensor connected to the manipulator in data communication with the control unit, the at least one inertial sensor operable to detect acceleration values for comparison to the stored in memory theoretical values to detect an impulsive impact by the manipulator;

a third detection device comprising a torque measuring device, the torque measuring device operable to detect torque values from at least one of the plurality of electric motors for comparison to the stored in memory theoretical torque values to detect a non-impulsive impact with by the manipulator, the control unit operable on detection of a foreign object in the predetermined work area by the first detection device to reduce respective speeds of the manipulator electric motors to a predetermined threshold level lower than a working speed in the automatic operating mode, and the control unit operable on detecting an impulsive impact by the second detection system or a non-impulsive impact by the third detection system to stop a movement of the manipulator or govern reversal of the movement thereof.

* * * * *